US 12,374,118 B2

(12) United States Patent
Hirata et al.

(10) Patent No.: US 12,374,118 B2
(45) Date of Patent: Jul. 29, 2025

(54) SERVER DEVICE, METHOD FOR CONTROLLING SERVER DEVICE, AND STORAGE MEDIUM

(71) Applicant: NEC Corporation, Tokyo (JP)

(72) Inventors: Satoshi Hirata, Tokyo (JP); Hajime Yamashita, Tokyo (JP); Kenta Aino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/033,708

(22) PCT Filed: Nov. 6, 2020

(86) PCT No.: PCT/JP2020/041551
§ 371 (c)(1),
(2) Date: Apr. 25, 2023

(87) PCT Pub. No.: WO2022/097277
PCT Pub. Date: May 12, 2022

(65) Prior Publication Data
US 2023/0394836 A1 Dec. 7, 2023

(51) Int. Cl.
*G06V 20/52* (2022.01)
*G06Q 50/10* (2012.01)

(52) U.S. Cl.
CPC ............ *G06V 20/53* (2022.01); *G06Q 50/10* (2013.01)

(58) Field of Classification Search
None
See application file for complete search history.

(56) References Cited

U.S. PATENT DOCUMENTS

| 2013/0030875 A1* | 1/2013 | Lee ............... G06Q 30/0601 705/14.58 |
| 2016/0210829 A1* | 7/2016 | Uchida .......... G08B 13/19645 |
| 2019/0012547 A1* | 1/2019 | Togashi ................ H04N 7/18 |
| 2019/0213855 A1* | 7/2019 | Oami ............... G08B 13/1968 |

(Continued)

FOREIGN PATENT DOCUMENTS

| JP | 3111411 U | 7/2005 |
| JP | 2009-282687 A | 12/2009 |
| JP | 2014-127962 A | 7/2014 |

(Continued)

OTHER PUBLICATIONS

International Search Report for PCT Application No. PCT/JP2020/041551, mailed on Feb. 9, 2021.

(Continued)

*Primary Examiner* — Gelek W Topgyal

(57) ABSTRACT

A server device (100) that contributes to resolving congestion in an event venue or the like is provided. The server device (100) includes a calculation unit (101) and an instruction unit (102). The calculation unit (101) calculates a degree of congestion of a monitored facility which is a facility to be monitored for a congestion state. The instruction unit (102) determines, based on the degree of congestion of the monitored facility, whether or not the monitored facility is congested. When the monitored facility is congested, the instruction unit (102) instructs a staff member in a venue including the monitored facility to resolve the congestion of the congested monitored facility.

11 Claims, 12 Drawing Sheets

(56) References Cited

U.S. PATENT DOCUMENTS

2019/0228234 A1* 7/2019 Teshima ................. G06V 20/53
2020/0302188 A1   9/2020 Iwai

FOREIGN PATENT DOCUMENTS

| JP | 2017-188023 A | 10/2017 |
| JP | 2018-042049 A | 3/2018 |
| JP | 2019191856 A * | 10/2019 |
| JP | 2020-181471 A | 11/2020 |
| WO | 2017/038450 A1 | 3/2017 |
| WO | 2017/122258 A1 | 7/2017 |

OTHER PUBLICATIONS

JP Office Communication for JP Application No. 2022-560604, mailed on Feb. 25, 2025 with English Translation.

* cited by examiner

| CAMERA ID | MONITORED FACILITY |
|---|---|
| 20-1 | WEST RESTROOM |
| 20-2 | NORTH RESTROOM |
| 20-3 | DINING FACILITY |
| 20-4 | SHOP |
| ⋮ | ⋮ |

| CAMERA ID | CONSTANT |
|---|---|
| 20-1 | A1 |
| 20-2 | A2 |
| 20-3 | A3 |
| 20-4 | A4 |
| ... | ... |

Fig. 9

| MONITORED FACILITY | DEGREE OF CONGESTION(%) |
|---|---|
| WEST RESTROOM | C1 |
| NORTH RESTROOM | C2 |
| DINING FACILITY | C3 |
| SHOP | C4 |
| ... | ... |

Fig. 10

```
CONGESTION RESOLUTION INSTRUCTION

WEST RESTROOM IS CONGESTED.
RESOLVE CONGESTION OF WEST RESTROOM.
NORTH RESTROOM AND DINING FACILITY
ARE UNCROWDED.
```

Fig. 14

```
CONGESTION RESOLUTION INSTRUCTION

WEST RESTROOM IS CONGESTED.
RESOLVE CONGESTION OF WEST RESTROOM.
STATES OF OTHER RESTROOMS ARE AS FOLLOWS.
CONGESTION RATE OF NORTH RESTROOM = 120%
CONGESTION RATE OF EAST RESTROOM = 70%
CONGESTION RATE OF SOUTH RESTROOM = 60%
```

Fig. 15

| MONITORED FACILITY | PREDICTED DEGREE OF CONGESTION (%) |
|---|---|
| WEST RESTROOM | C11 |
| NORTH RESTROOM | C12 |
| DINING FACILITY | C13 |
| SHOP | C14 |
| ⋮ | ⋮ |

# SERVER DEVICE, METHOD FOR CONTROLLING SERVER DEVICE, AND STORAGE MEDIUM

This application is a National Stage Entry of PCT/JP2020/041551 filed on Nov. 6, 2020, the contents of all of which are incorporated herein by reference, in their entirety.

TECHNICAL FIELD

The present invention relates to a server device, a method for controlling a server device, and a storage medium.

BACKGROUND ART

There is a technology for grasping a congestion state in an event venue or the like using image data obtained from a monitoring camera or the like.

For example, Patent Literature 1 describes that a user can immediately grasp an activity of a person in an area to which a user pays attention in a facility. Patent Literature 2 describes providing a system that visualizes the degree of congestion in the entire facility using a monitoring camera. The literature describes that the system detects a crowd from a monitoring camera image and estimates a congestion state in a camera image range by obtaining a size (number of people) of the crowd from an edge amount of the crowd.

CITATION LIST

Patent Literature

Patent Literature 1: Japanese Unexamined Patent Application Publication No. 2017-188023
Patent Literature 2: International Patent Publication No. WO2017/122258

SUMMARY OF INVENTION

Technical Problem

In event venues such as baseball stadiums and soccer stadiums, facilities such as restrooms and shops may be congested. Even in a case where the event venues are wide, and the event venues are locally congested, it is difficult for an event company or the like to grasp the occurrence of the congestion. When congestion continues in a restroom or the like for a long period of time, the degree of satisfaction of event visitors decreases. Therefore, it is desirable that congestion in an event venue or the like be quickly resolved. The above-described problem cannot be solved by applying the techniques disclosed in Patent Literatures 1 and 2. This is because both literatures aim to visualize a congestion state.

A main object of the present invention is to provide a server device, a method for controlling a server device, and a storage medium that contribute to resolving congestion in an event venue or the like.

Solution to Problem

According to a first aspect of the present invention, there is provided a server device including: a calculation unit configured to calculate a degree of congestion of a monitored facility that is a facility to be monitored for a congestion state; and an instruction unit configured to determine, based on the degree of congestion of the monitored facility, whether or not the monitored facility is congested, and instruct, when the monitored facility is congested, a staff member in a venue including the monitored facility to resolve the congestion of the congested monitored facility.

According to a second aspect of the present invention, there is provided a method for controlling a server device, the method including, by the server device: calculating a degree of congestion of a monitored facility that is a facility to be monitored for a congestion state; determining, based on the degree of congestion of the monitored facility, whether or not the monitored facility is congested; and instructing, when the monitored facility is congested, a staff member in a venue including the monitored facility to resolve the congestion of the congested monitored facility.

According to a third aspect of the present invention, there is provided a computer-readable storage medium storing a program for causing a computer installed in a server device to execute: processing of calculating a degree of congestion of a monitored facility that is a facility to be monitored for a congestion state; processing of determining, based on the degree of congestion of the monitored facility, whether or not the monitored facility is congested; and processing of instructing, when the monitored facility is congested, a staff member in a venue including the monitored facility to resolve the congestion of the congested monitored facility.

Advantageous Effects of Invention

According to each aspect of the present invention, there are provided a server device, a method for controlling a server device, and a storage medium that contribute to resolving congestion in an event venue or the like. Note that the effects of the present invention are not limited to the above. According to the present invention, other effects may be exhibited instead of or in addition to the effects.

BRIEF DESCRIPTION OF DRAWINGS

FIG. 9 is a diagram for explaining an operation of the degree-of-congestion calculation unit according to the first example embodiment.

FIG. 10 is a diagram for explaining an operation of the degree-of-congestion calculation unit according to the first example embodiment.

FIG. 14 is a diagram for explaining an operation of the congestion resolution instruction unit according to the second example embodiment.

FIG. 15 is a diagram for explaining an operation of the congestion resolution instruction unit according to the second example embodiment.

EXAMPLE EMBODIMENTS

Figure 1:
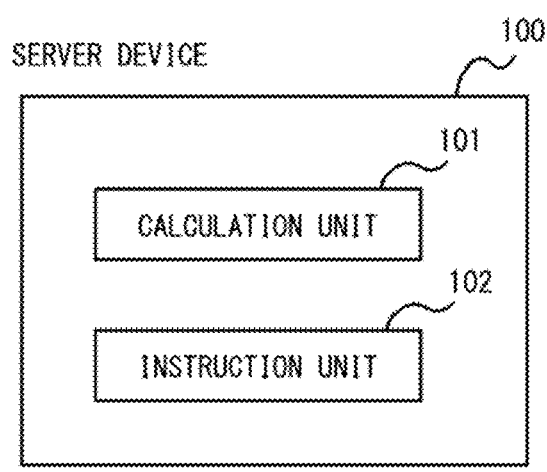
FIG. 1 is a diagram for explaining an outline of an example embodiment.

First, an outline of an example embodiment will be described. Note that the reference numerals in the drawings described in this outline are used to refer to each element for convenience as an example for assisting understanding, and the description of this outline is not intended to be any limitation. In addition, in a case where there is no particular explanation, a block described in each drawing represents not a configuration of a hardware unit but a configuration of a functional unit. Connection lines between blocks in each drawing include both bidirectional and unidirectional lines. Each unidirectional arrow schematically indicates a flow of a main signal (data), and does not exclude bidirectionality. Note that, in the present specification and the drawings, elements that can be similarly described are denoted by the same reference numerals, and redundant description can be omitted.

A server device 100 according to the one example embodiment includes a calculation unit 101 and an instruction unit 102 (see FIG. 1). The calculation unit 101 calculates a degree of congestion of a monitored facility which is a facility to be monitored for a congestion state. The instruction unit 102 determines, based on the degree of congestion of the monitored facility, whether or not the monitored facility is congested. When the monitored facility is congested, the instruction unit 102 instructs a staff member in a venue including the monitored facility to resolve the congestion of the congested monitored facility.

The server device 100 calculates a degree of congestion of a facility which is a target to be monitored for a congestion state. The server device 100 instructs, based on the calculated degree of congestion, a staff member to resolve the congestion of the congested facility. As a result, the congestion in the event venue or the like is resolved.

Hereinafter, specific example embodiments will be described in more detail with reference to the drawings.

First Example Embodiment

A first example embodiment will be described in more detail with reference to the drawings.

[System Configuration]

Figure 2:
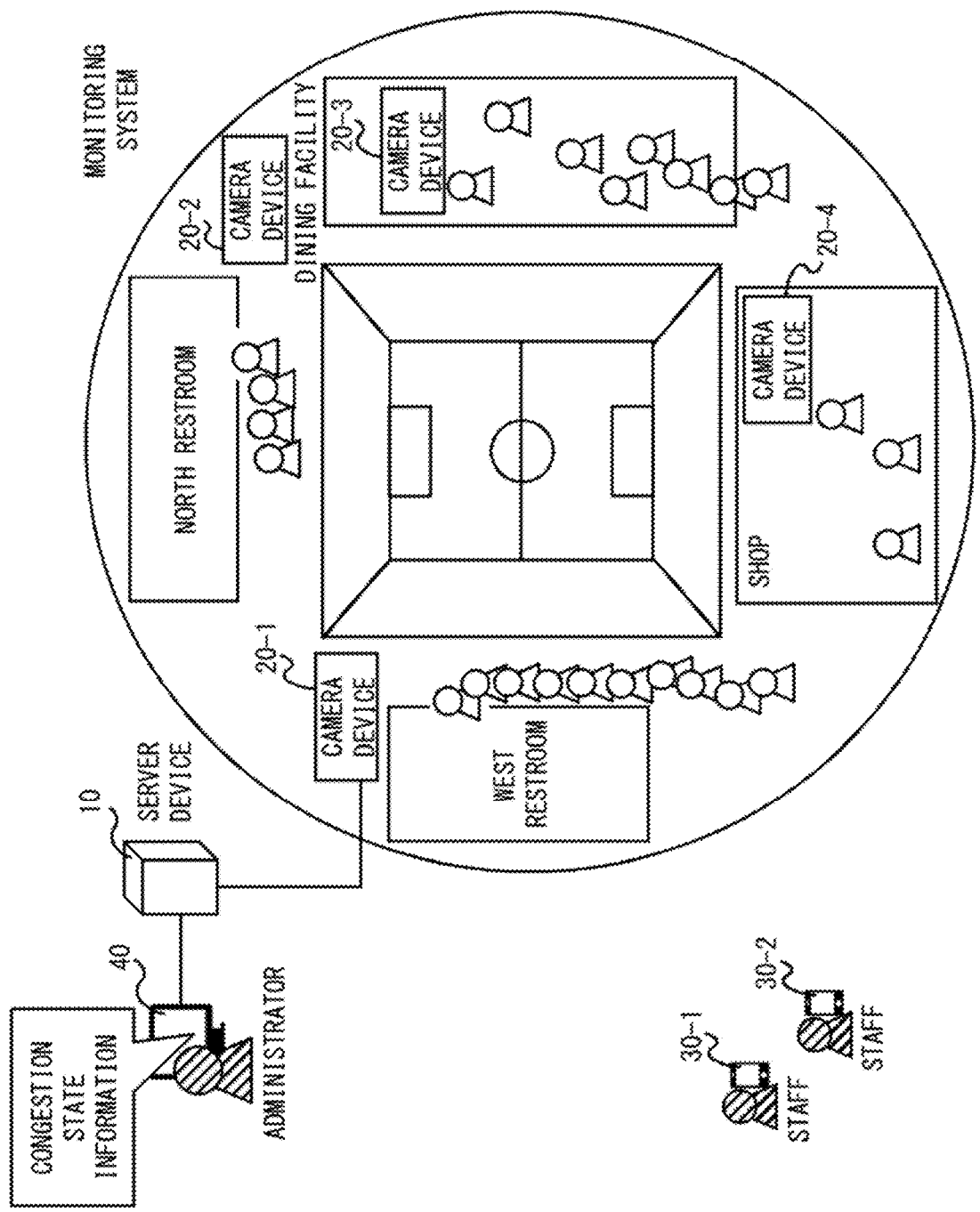
FIG. 2 is a diagram illustrating an example of a schematic configuration of a monitoring system according to a first example embodiment.

FIG. 2 is a diagram illustrating an example of a schematic configuration of a monitoring system according to the first example embodiment. Referring to FIG. 2, the monitoring system includes a server device 10 and a plurality of camera devices 20-1 to 20-4.

The monitoring system according to the first example embodiment is a system that monitors a congestion state of each of facilities (for example, restrooms, a shop, a dining facility, and the like) in a venue such as a soccer stadium, a baseball stadium, or a concert hall.

The monitoring system provides information regarding the congestion state of each facility to an administrator (such as a manager of an event). The administrator performs handling according to the congestion state of each facility. For example, the administrator instructs a staff member working at the event venue to go to a congested facility and resolve the congestion of the facility.

In FIG. 2, persons illustrated in white indicate visitors at the event venue, persons indicated by hatching as staff indicates staff members (employees) working at the event venue, and a person indicated by hatching as an administrator indicates the administrator.

The server device 10 is a device that controls the entire monitoring system. The server device 10 may be installed in the event venue, or may be installed on a network (on a cloud).

The camera devices 20-1 to 20-4 are installed in the vicinity of the facilities where congestion states are desired to be grasped. For example, in a case where congestion states are grasped for each of the restrooms (north restroom, west restroom), the dining facility, and the shop, the camera devices 20-1 to 20-4 are installed so as to monitor a line of visitors lined up at each facility.

In the following description, a facility to be monitored for a congestion state will be referred to as a "congestion state monitored facility" or simply as a "monitored facility". In the example illustrated in FIG. 2, each of the two restrooms, the dining facility, and the shop is a congestion state monitored facility. However, it is a matter of course that the congestion state monitored facilities are not intended to be limited to these facilities (places). A passage of the event venue may be set as a congestion state monitored facility.

Furthermore, in the following description, in a case where there is no particular reason to distinguish the camera devices 20-1 to 20-4, they are simply described as "camera devices 20". Similarly, other configurations are represented by reference signs to the left of hyphens.

The devices illustrated in FIG. 2 are connected to each other. For example, the server device 10 and the camera devices 20 are connected by wired or wireless communication means, and are configured to be able to communicate with each other. A terminal 30 possessed by a staff member and the server device 10 are also connected by wireless communication means or the like. Note that, in FIG. 2, a connection line between the server device 10 and the camera device 20-1 is illustrated, and illustration of other connection lines is omitted.

The configuration of the monitoring system illustrated in FIG. 2 is an example and is not intended to limit the configuration. For example, the system may include a plurality of server devices 10. In addition, although the four camera devices 20 are illustrated in FIG. 2, it is a matter of course that the number of camera devices 20 included in the monitoring system is not limited. In addition, a plurality of camera devices 20 may be required to cover one monitored facility.

[Outline of Operation]

Next, an outline of an operation of the monitoring system according to the first example embodiment will be described with reference to the drawings.

Each of the camera devices 20 transmits, to the server device 10, image data (still image, video) acquired periodically or at a predetermined timing and a camera ID which is identification information of the device. As the camera ID, an internet protocol (IP) address or a media access control (MAC) address of the camera device 20 can be used.

The server device 10 analyzes the image data obtained from the camera devices 20 to calculate a degree of congestion of each monitored facility. For example, the server device 10 may extract face images (face areas) from the image data and calculate the degrees of congestion based on the numbers of extracted face images.

The server device 10 provides the administrator with information using the generated degrees of congestion. More specifically, the server device 10 displays information indicating the congestion state of each monitored facility on an administrator terminal 40. In the following description, information indicating the congestion state of a monitored facility is referred to as "congestion state information".

Figure 3:
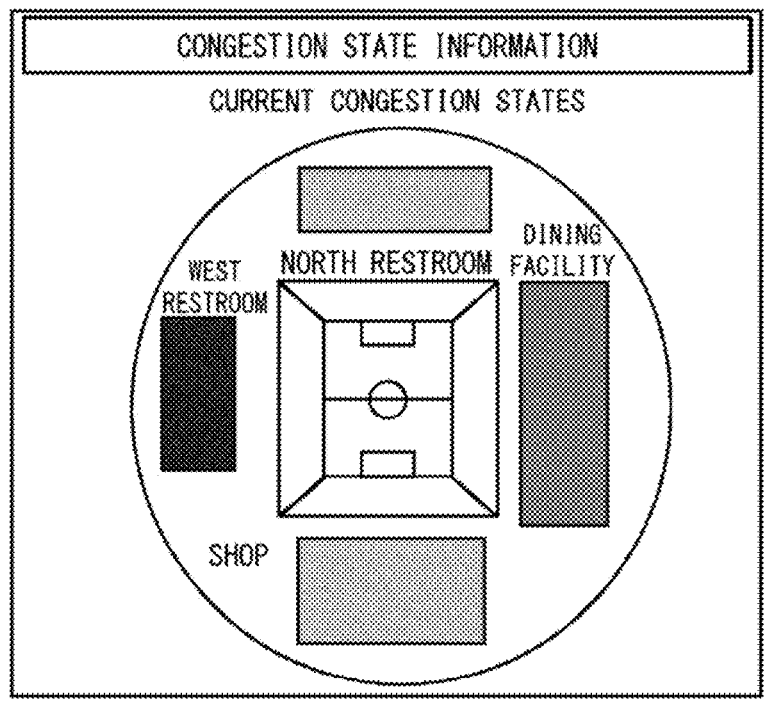
FIG. 3 is a diagram for explaining an operation of the monitoring system according to the first example embodiment.

For example, the server device 10 displays information visualizing the degrees of congestion on the administrator terminal 40 as illustrated in FIG. 3. FIG. 3 illustrates map information (so-called heat map) expressing changes in the degrees of congestion of the monitored facilities by using changes in color. In FIG. 3, each of the degrees of congestion is expressed in three stages (congestion, normal, sparse), and the darker the color, the higher the degree of congestion.

Figure 4:
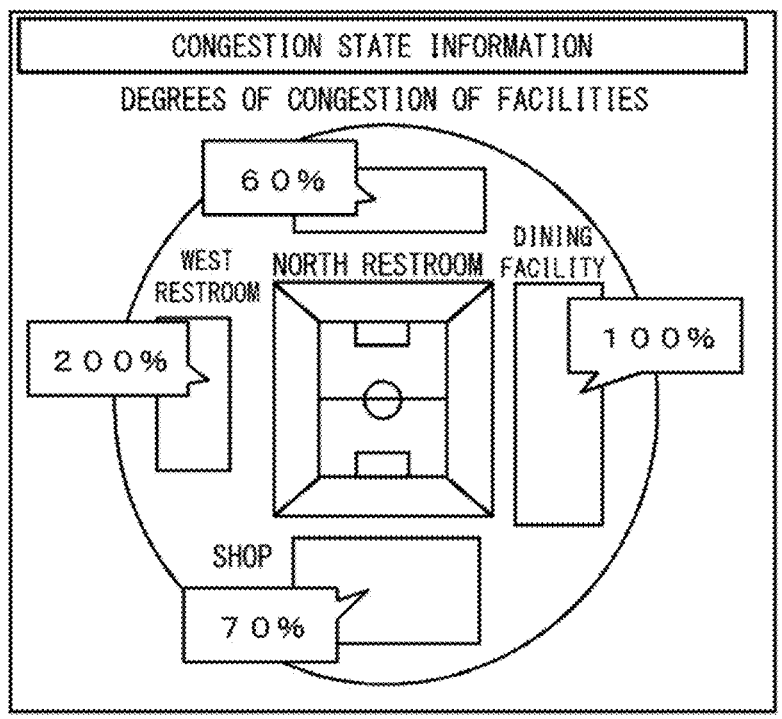
FIG. 4 is a diagram for explaining an operation of the monitoring system according to the first example embodiment.

Alternatively, the server device 10 may display the calculated degrees of congestion as they are on the map instead of or in addition to the provision of the information of the congestion states by the heat map (see FIG. 4). Alternatively, the server device 10 may convert the degrees of congestion into messages and display the messages on the map (see FIG. 5). In this manner, the server device may display, on the administrator terminal 40, the map information that indicates the event venue and on which the degrees of congestion of the monitored facilities are superimposed or the map information on which words obtained from the degrees of congestion of the monitored facilities are superimposed.

Figure 5:
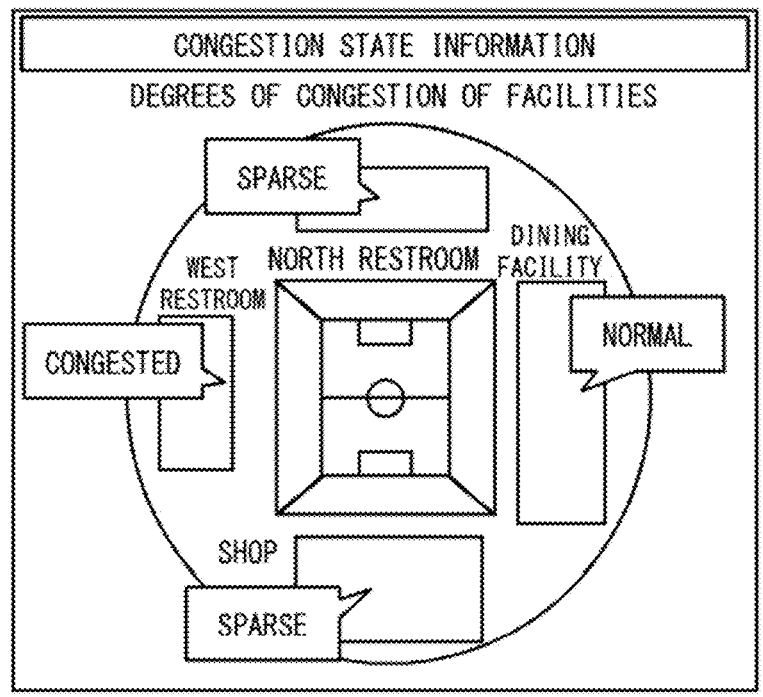
FIG. 5 is a diagram for explaining an operation of the monitoring system according to the first example embodiment.
Figure 6:
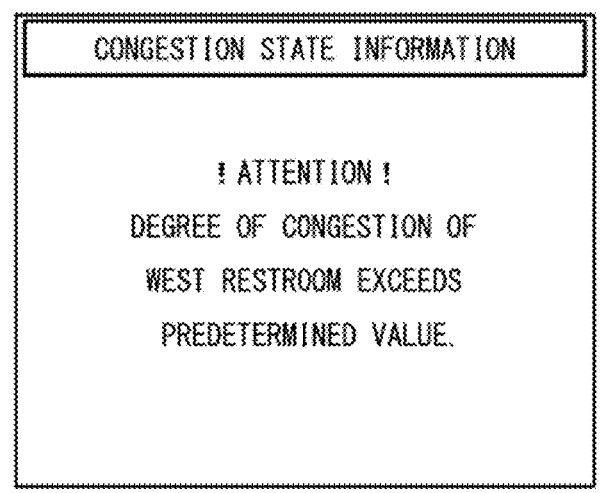
FIG. 6 is a diagram for explaining an operation of the monitoring system according to the first example embodiment.

The server device 10 is not limited to the information provision using the map information as illustrated in FIGS. 3 to 5, and may provide congestion state information by text as illustrated in FIG. 6. That is, the provision of the information of the congestion states by the server device 10 is not limited to the provision of the information visualizing the degrees of congestion.

The administrator who has received the "congestion state information" provided by the server device 10 via the administrator terminal 40 determines whether or not it is necessary to resolve the congestion of the monitored facilities. When the administrator determines that it is necessary to resolve the congestion of a monitored facility, the administrator instructs a staff member waiting at the event venue to resolve the congestion.

Note that the administrator instructs the staff member to resolve the congestion based on his/her own experience or the like. Even when a specific monitored facility is congested, the administrator may not immediately instruct to resolve the congestion of the facility. For example, even in a situation where a specific monitored facility is temporarily congested, in a situation where the congestion is expected to be gradually resolved, the administrator does not instruct to resolve the congestion of the facility. On the other hand, when a situation in which congestion continues is expected, the administrator instructs a staff member to resolve the congestion.

The administrator instructs the staff member to resolve the congestion by means such as calling the terminal 30 possessed by the staff member or transmitting an e-mail to the terminal 30 possessed by the staff member. For example, when the administrator who has viewed the display of FIGS. 3 to 6 determines that it is necessary to resolve the congestion of the west restroom, the administrator instructs the staff member to resolve the congestion of the facility. For example, the administrator instructs the staff member to guide visitors to the uncrowded north restroom. Alternatively, in a case where the administrator determines that it is necessary to resolve the congestion, the administrator may transmit the image data illustrated in FIGS. 3 to 6 to the terminal 30 possessed by the staff member.

Next, details of each device included in the monitoring system according to the first example embodiment will be described.

[Server Device]

Figures 7, 8:
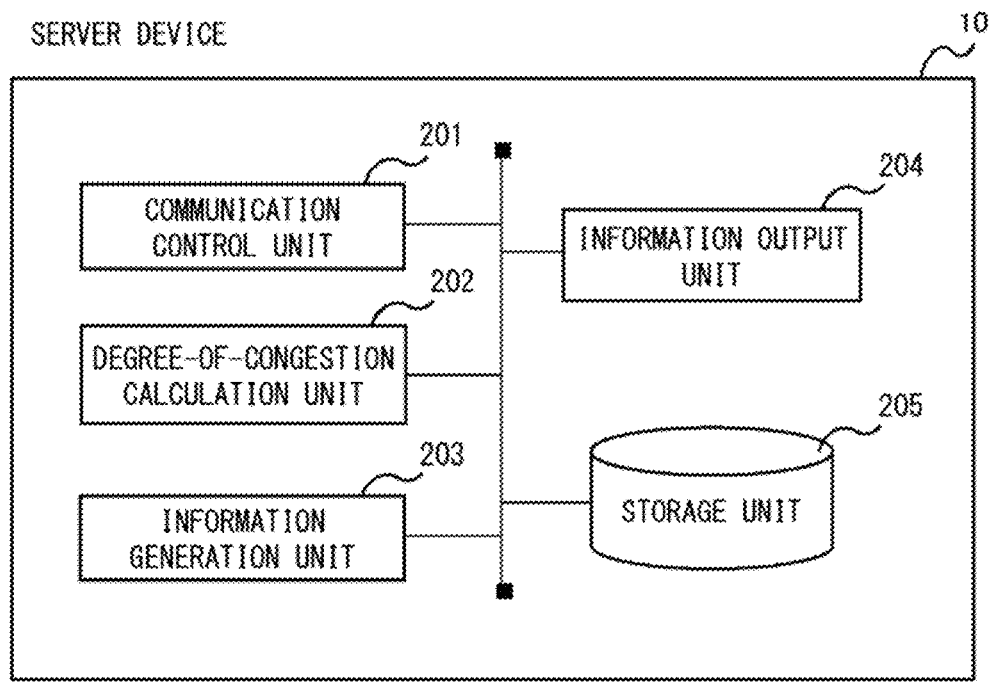
FIG. 7 is a diagram illustrating an example of a processing configuration of a server device according to the first example embodiment.
FIG. 8 is a diagram for explaining an operation of a degree-of-congestion calculation unit according to the first example embodiment.

FIG. 7 is a diagram illustrating an example of a processing configuration (processing modules) of the server device 10 according to the first example embodiment. Referring to FIG. 7, the server device 10 includes a communication control unit 201, a degree-of-congestion calculation unit 202, an information generation unit 203, an information output unit 204, and a storage unit 205.

The communication control unit 201 is means for controlling communication with other devices. For example, the communication control unit 201 receives image data (packets including image data) from the camera devices 20. In addition, the communication control unit 201 transmits data to the administrator terminal 40.

The degree-of-congestion calculation unit 202 is means for calculating the degree of congestion of a congestion state monitored facility. The degree-of-congestion calculation unit 202 calculates a degree of congestion of each monitored facility by analyzing image data obtained from the camera devices 20.

Specifically, the degree-of-congestion calculation unit 202 identifies the monitored facilities based on camera IDs acquired from the camera devices 20. In this case, the degree-of-congestion calculation unit 202 identifies the monitored facilities with reference to table information in which the camera IDs and the monitored facilities are stored in association with each other (see FIG. 8). Note that, in FIG. 8, for easy understanding, reference signs assigned to the camera devices 20 are used for the camera IDs.

The degree-of-congestion calculation unit 202 tries to extract a face image from the image data acquired from the camera devices 20.

Note that an existing technique can be used for the face image detection processing and the face image extraction processing by the degree-of-congestion calculation unit 202, and thus, a detailed description thereof will be omitted. For example, the degree-of-congestion calculation unit 202 may extract the face image (face area) from the image data using a learning model learned by a convolutional neural network (CNN). Alternatively, the degree-of-congestion calculation unit 202 may extract the face image using a method such as template matching.

The degree-of-congestion calculation unit 202 counts the number of face images extracted from the image data using the above-described method.

The degree-of-congestion calculation unit 202 acquires a constant (the number of times that the degree of congestion is determined to be normal) of each monitored facility based on the cameras ID acquired from the camera devices 20. For example, the degree-of-congestion calculation unit 202 refers to table information as illustrated in FIG. 9 to acquire the constants (fixed numbers) of the monitored facilities. Note that the administrator or the like registers the constant of each monitored facility in the server device 10 in advance.

The degree-of-congestion calculation unit 202 calculates a degree of congestion by dividing the number of face images extracted from the image data by the constant of the monitored facility. For example, in a case where the constant of the shop is "10", and face images of 7 people can be extracted from image data captured by the camera device 20-4 that captures the inside of the shop, the degree of congestion of the shop is calculated as "7/10×100=70%".

Alternatively, the degree-of-congestion calculation unit 202 may estimate the number of people in the monitored facility by inputting the image data to the learning model. For example, a learning model (estimator) that outputs the number of people in the monitored facility when the image data is input is prepared in advance. Alternatively, the degree-of-congestion calculation unit 202 may calculate the number of people in the monitored facility by inputting the image data to the learning model. In the learning of the learning model, image data in which a plurality of persons appear and information of the number of persons corresponding to the image data may be used as teacher data. Any algorithm such as a support vector machine, boosting, or a neural network can be used to generate the learning model. Note that a known technique can be used as the algorithm such as the support vector machine, and thus the description thereof will be omitted.

The degree-of-congestion calculation unit 202 calculates the degree of congestion of each monitored facility periodically or at a predetermined timing each time image data is acquired from the camera devices 20. The degree-of-congestion calculation unit 202 stores (manages) the degree of congestion calculated for each monitored facility. For example, the degree-of-congestion calculation unit 202 manages the degrees of congestion using a table as illustrated in FIG. 10.

The information generation unit 203 is means for generating congestion state information to be provided to the administrator. The information generation unit 203 may generate the congestion state information in response to an instruction from the administrator, or may generate the congestion state information periodically or at a predetermined timing.

The information generation unit 203 generates, based on the degrees of congestion of the monitored facilities calculated by the degree-of-congestion calculation unit 202, the congestion state information to be provided to the administrator who manages the event venue including the monitored facilities.

For example, the information generation unit 203 generates, based on the degree of congestion of each monitored facility, a heat map (heat map regarding the degrees of congestion) as illustrated in FIG. 3. The information generation unit 203 may determine a gray level (color) for each monitored facility according to a numerical range to which the degree of congestion of each monitored facility belongs.

Alternatively, as illustrated in FIG. 4, the information generation unit 203 may generate congestion state information including map information that mimics a layout of the event venue and on which the degrees of congestion of the monitored facilities are superimposed as it is.

Alternatively, as illustrated in FIG. 5, the information generation unit 203 may classify the degrees of congestion of the monitored facilities and generate map information including words that briefly express the situation of each class as the congestion state information. In the example illustrated in FIG. 5, the degrees of congestion are expressed by being classified into three stages of "congestion", "normal", and "sparse".

Alternatively, as illustrated in FIG. 6, the information generation unit 203 may generate, as congestion state information, information regarding a monitored facility in which the degree of congestion exceeds a predetermined value. That is, the information generation unit 203 may generate congestion state information that is a warning regarding the monitored facility in which the degree of congestion exceeds the predetermined value. Alternatively, the information generation unit 203 may generate congestion state information including the degree of congestion of each monitored facility.

The information generation unit 203 delivers the generated congestion state information to the information output unit 204.

The information output unit 204 is means for outputting information. More specifically, the information output unit 204 outputs the congestion state information to the administrator terminal 40 used by the administrator. Alternatively, the information output unit 204 may output the congestion state information to a printer and cause the printer to print the information. The information output unit 204 may transmit the congestion state information to a mail address via which the congestion state information can be received by a terminal (a terminal such as a smartphone) possessed by the administrator.

The storage unit 205 is means for storing information necessary for the operation of the server device 10.

[Other Devices]

Detailed description of processing configurations and the like regarding the camera devices 20, the terminal 30, and the administrator terminal 40 will be omitted. This is because existing devices can be used as these devices, and it is obvious to those skilled in the art. For example, the terminal 30 is a mobile phone, a smartphone, or the like. The administrator terminal 40 is a personal computer or the like.

[Operation of Monitoring System]

Next, an operation of the monitoring system according to the first example embodiment will be described.

Figure 11:
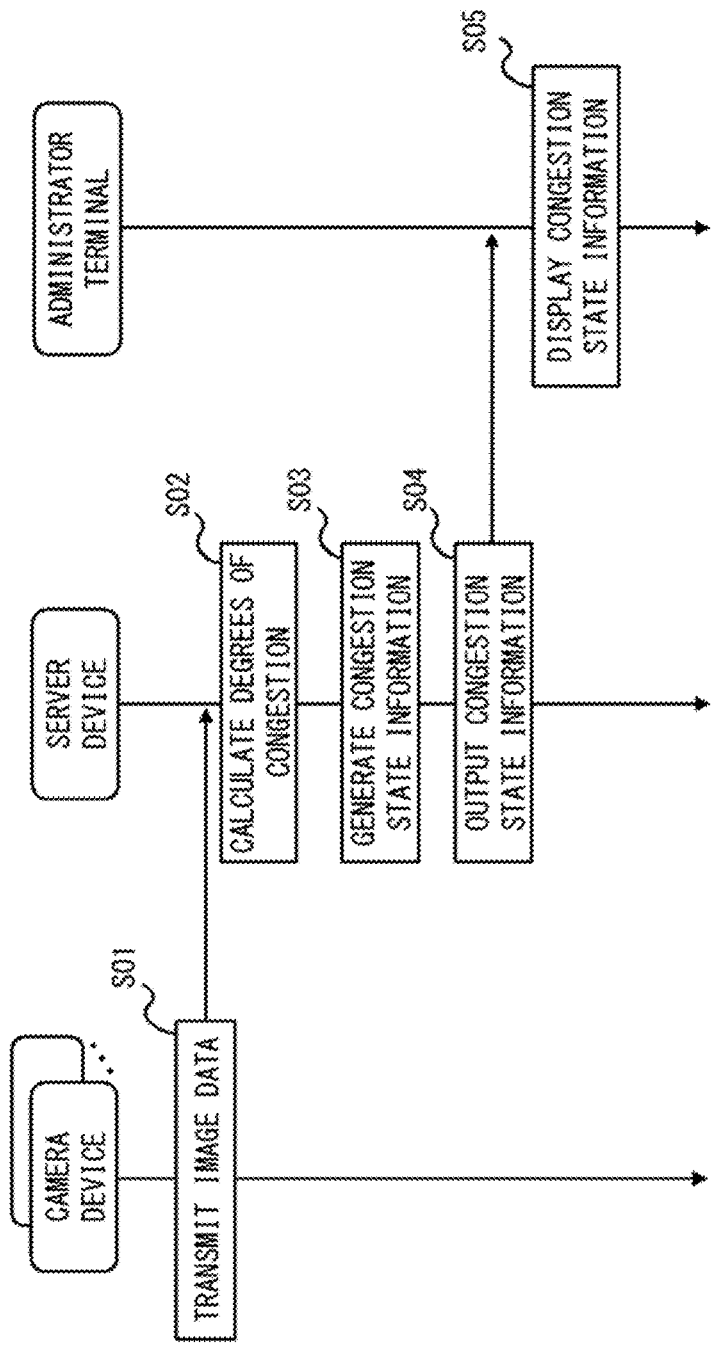
FIG. 11 is a sequence diagram illustrating an example of an operation of the monitoring system according to the first example embodiment.

FIG. 11 is a sequence diagram illustrating an example of an operation of the monitoring system according to the first example embodiment. An operation of providing information to the administrator will be described with reference to FIG. 11.

The camera devices 20 installed so as to be able to photograph lines formed in the monitored facilities transmit image data to the server device 10 (step S01).

The server device 10 calculates the degrees of congestion of the monitored facilities by analyzing the image data (step S02).

The server device 10 generates congestion state information based on the degree of congestion of each monitored facility (step S03).

The server device 10 outputs the congestion state information to the administrator terminal 40 (step S04).

The administrator terminal 40 displays the received congestion state information (step S05).

As described above, in the monitoring system according to the first example embodiment, the server device 10 calculates the degrees of congestion of the congestion state monitored facilities. The server device 10 provides information to the administrator who manages the event venue on the basis of the calculated degrees of congestion. The administrator who has viewed the congestion state information provided from the server device 10 can take measures such as instructing a staff member to resolve the congestion as necessary. In particular, since the server device 10 expresses the congestion information (congestion degree level) of the monitored facilities on the map (drawing) of the event venue as illustrated in FIG. 3, the administrator can monitor the degree of congestion of the entire event venue in a bird's-eye view.

Second Example Embodiment

A second example embodiment will be described in more detail with reference to the drawings.

In the first example embodiment, the case where the server device 10 generates the congestion state information based on the degrees of congestion of the congestion state monitored facilities and provides the information to the administrator has been described. The administrator instructs a staff member to resolve the congestion based on the information.

In the second example embodiment, it will be described that congestion is resolved by a server device 10 directly instructing a staff member. That is, in the second example embodiment, the server device 10 transmits information to a terminal 30 possessed by the staff member to resolve the congestion without the determination by the administrator.

Since the configuration of a monitoring system according to the second example embodiment can be the same as that of the first example embodiment, the description thereof will be omitted.

Differences between the first and second example embodiments will be described below.

Figure 12:
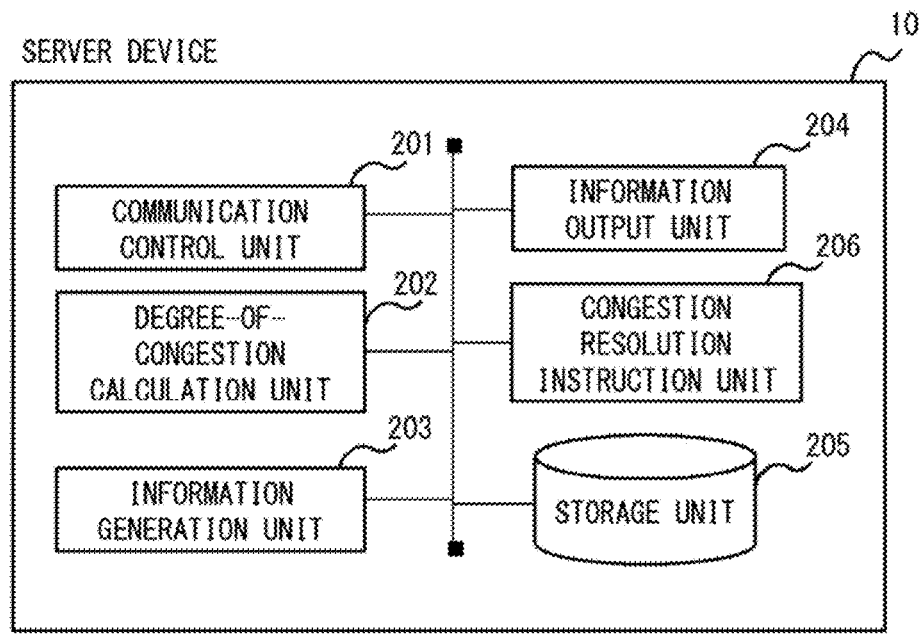
FIG. 12 is a diagram illustrating an example of a processing configuration of a server device according to a second example embodiment.

FIG. 12 is a diagram illustrating an example of a processing configuration (processing modules) of the server device 10 according to the second example embodiment. Referring to FIG. 12, a congestion resolution instruction unit 206 is added to the configuration according to the first example embodiment.

Note that, in the second example embodiment, the information generation unit 203 may not be present or may be present. That is, the server device 10 may instruct the staff member to resolve congestion while providing information to the administrator similarly to the first example embodiment, or may instruct the staff member to resolve the congestion without providing the information to the administrator.

The congestion resolution instruction unit 206 is means for instructing the staff member to resolve congestion in the monitored facilities. When a monitored facility is congested, the congestion resolution instruction unit 206 instructs the staff member at the event venue to resolve the congestion of the congested monitored facility.

The congestion resolution instruction unit 206 generates a "congestion resolution instruction" based on the degree of congestion of each monitored facility. The congestion resolution instruction unit 206 delivers the generated congestion resolution instruction to the information output unit 204. The information output unit 204 transmits the acquired congestion resolution instruction to the terminal 30 possessed by the staff member. In a case where a plurality of staff members is working at the event venue, the information output unit 204 broadcasts the congestion resolution instruction to each terminal 30.

The generation of the congestion resolution instruction will be described below.

For example, the congestion resolution instruction unit 206 executes threshold processing on the degrees of congestion of the monitored facilities, and generates the congestion resolution instruction according to the results of the processing. For example, in the example illustrated in FIG. 2, when the degree of congestion of the west restroom is higher than a first threshold, the congestion resolution instruction unit 206 generates a congestion resolution instruction for the purpose of resolving the congestion of the west restroom. Specifically, the congestion resolution instruction unit 206 generates a congestion resolution instruction (instruction, command) indicating a "congestion resolution target facility: west restroom".

Figure 13:
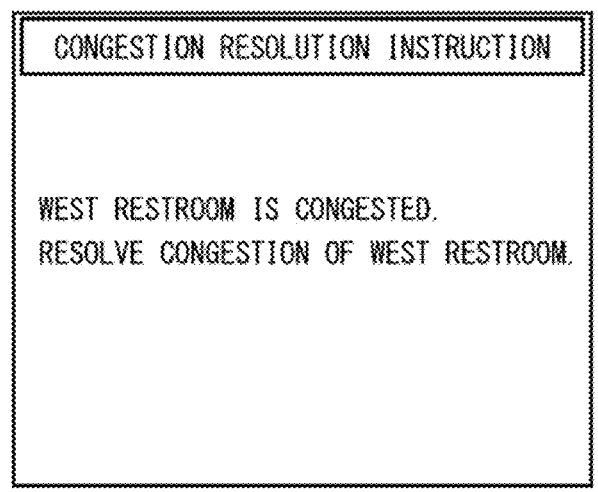
FIG. 13 is a diagram for explaining an operation of a congestion resolution instruction unit according to the second example embodiment.

The terminal 30 that has received the instruction performs display as illustrated in FIG. 13, for example. The staff member who has viewed the display goes to the west restroom and takes measures to resolve the congestion around the facility. As described above, the congestion resolution instruction unit 206 generates the congestion resolution instruction including the information (for example, the name or the like of the monitored facility) of the facility targeted for the congestion resolution. The generated congestion resolution instruction is transmitted to the terminal 30 possessed by the staff member via the information output unit 204.

The congestion resolution instruction unit 206 may generate a congestion resolution instruction including information (for example, the degree of congestion) of a monitored facility in which the degree of congestion is equal to or less than a second threshold in addition to a congestion resolution target facility (a monitored facility in which the degree of congestion exceeds the threshold). That is, the congestion resolution instruction unit 206 may generate a congestion resolution instruction including information of a non-congested facility in addition to information of a congested facility.

For example, in the example illustrated in FIG. 2, when the degrees of congestion of the north restroom and the shop are equal to or less than the second threshold, a congestion resolution instruction including not only the information of the west restroom which is the congested facility (congestion resolution target facility) but also information of the north restroom and the shop which are non-congested facilities may be generated. In this case, the terminal 30 of the staff member performs display as illustrated in FIG. 14. The staff member who has viewed the display responds by guiding visitors at the west restroom to the north restroom or the dining facility.

Alternatively, the congestion resolution instruction unit 206 may generate a congestion resolution instruction including information regarding the same type of facility as the congested facility. For example, although not illustrated in FIG. 2, it is assumed that an east restroom and a south restroom are further installed in the event venue. In this case, when at least one or more of the degrees of congestion of the four restrooms installed in the event venue exceed the first threshold, the congestion resolution instruction unit 206 generates a congestion resolution instruction including information of the other restrooms.

For example, it is assumed that the congestion rate of the west restroom is 150% and exceeds the first threshold, the congestion rate of the north wide restroom is 120%, the congestion rate of the east restroom is 70%, and the congestion rate of the south restroom is 60%. In this case, the congestion resolution instruction unit 206 generates an instruction to resolve the congestion of the west restroom and a congestion resolution instruction including the congestion rates of the other restrooms.

In this case, the terminal 30 performs display as illustrated in FIG. 15. The staff member who has viewed the display of FIG. 15 guides visitors waiting at the west restroom to the east restroom and the south restroom. As described above, in addition to the congestion resolution instruction of the congested facility (instruction to resolve the congestion of the west restroom), the congestion resolution instruction unit 206 may generate a congestion resolution instruction including information (congestion rates of the other restrooms) of the same type of facility as the congested facility.

Alternatively, the congestion resolution instruction unit 206 may not cause information regarding a facility that is of the same type as the congested facility and in which the congestion rate is higher than a third threshold to be included in the congestion resolution instruction. In other words, the congestion resolution instruction unit 206 may generate a congestion resolution instruction including information of a monitored facility that is of the same type of facility as the congested facility and in which the degree of congestion is equal to or less than the third threshold. In the above-described example, the information of the north restroom may not be transmitted to the terminal 30, and the information of the east restroom and the south restroom may be transmitted to the terminal 30. This is because the staff member rarely guides a visitor to a congested monitored facility.

As described above, the congestion resolution instruction unit 206 may generate a congestion resolution instruction including not only information of the facility targeted for the congestion resolution but also information of a facility of the same type as the facility targeted for the congestion resolution. Alternatively, the congestion resolution instruction unit 206 may generate a congestion resolution instruction including information of a facility of the same type as the facility targeted for the congestion resolution and in which the degree of congestion is equal to or less than a predetermined threshold (third threshold).

The congestion resolution instruction unit 206 may generate a congestion resolution instruction including a specific method for resolving congestion. For example, the congestion resolution instruction unit 206 may give an instruction to guide a visitor to a facility that is of the same type as a congested facility and in which the degree of congestion is equal to or less than the third threshold. In the above-described example, the congestion resolution instruction unit 206 may generate a congestion resolution instruction to guide a visitor to the east restroom or the south restroom in addition to the instruction to resolve the congestion of the west restroom.

As described above, in the second example embodiment, the server device instructs, based on the degree of congestion of each monitoring facility, the staff member to resolve the congestion of the congested facility. As a result, even when the administrator is absent, congestion in the event venue can be resolved.

Third Example Embodiment

Next, a third example embodiment will be described in more detail with reference to the drawings.

In the third example embodiment, a case where a server device 10 predicts a future degree of congestion and generates congestion state information and a congestion resolution instruction using the predicted degree of congestion will be described.

Since the configuration of a monitoring system according to the third example embodiment can be the same as those described in the first and second example embodiments, the description thereof will be omitted.

Differences between the first and third example embodiments will be described below.

Figures 16, 17:
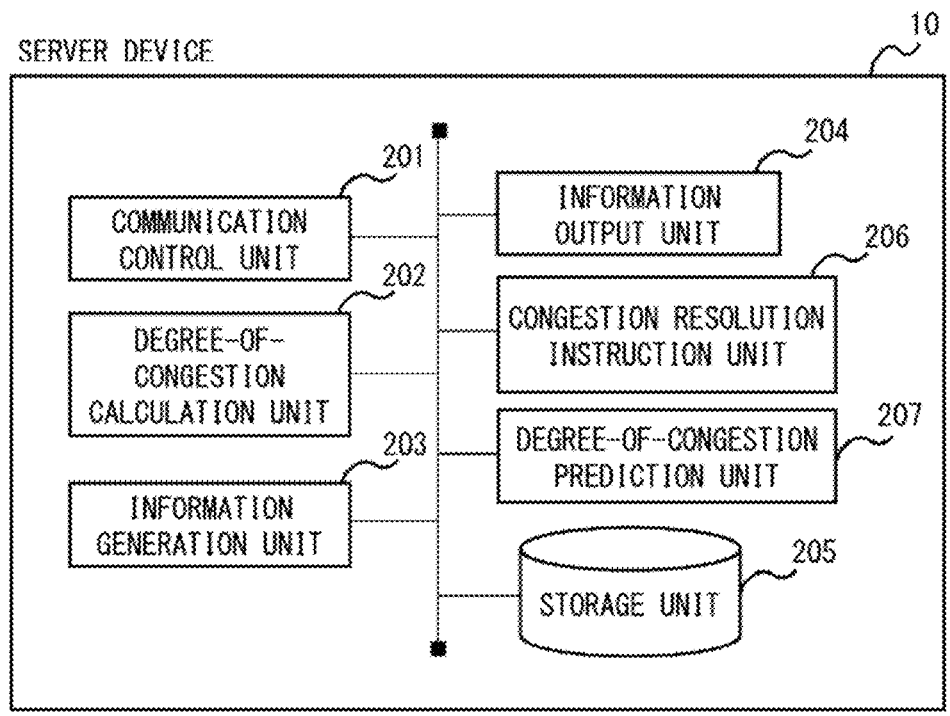
FIG. 16 is a diagram illustrating an example of a processing configuration of a server device according to a third example embodiment.
FIG. 17 is a diagram for explaining an operation of a degree-of-congestion prediction unit according to the third example embodiment.

FIG. 16 is a diagram illustrating an example of a processing configuration (processing modules) of the server device 10 according to the third example embodiment. Referring to FIG. 16, a degree-of-congestion prediction unit 207 is added to the configuration according to the second example embodiment.

The degree-of-congestion prediction unit 207 is means for predicting a future degree of congestion regarding a monitored facility. For example, the degree-of-congestion prediction unit 207 predicts the degree of congestion using a learning model generated on the basis of data collected in a past event held in the same event venue.

Every time an event is held, the administrator or the like collects image data indicating a line formed at a monitored facility and the degree of congestion when the image is acquired. The administrator or the like generates, as teacher data, a learning model using the image data and the degree of congestion (for example, the degree of congestion when 10 minutes elapse after the image data is acquired) after a lapse of a predetermined period from the time of the acquisition of the image data. The administrator or the like generates the learning model for each monitored facility. The administrator or the like implements the generated learning models in the server device 10. Note that a learning model according to a sport (baseball, soccer), an event type, a sports team, a singer (artist), or the like may be generated. That is, congestion prediction according to the type of the event or the like may be performed.

Here, it is considered that there is a feature in resolving congestion (line) for each monitored facility. For example, it is considered that the congestion of the restrooms and the congestion of the shop differ in the time required to resolve the congestion. This is because a person who stays in a restroom for a long time is rare, but the same person may stay in the shop for a long time. In the learning model generated in the third example embodiment, a feature regarding congestion for each monitored facility is reflected.

The degree-of-congestion prediction unit 207 acquires the degrees of congestion after a lapse of a predetermined period (for example, after 10 minutes) by inputting image data of each monitored facility to the learning model corresponding to the monitored facility. The degrees of congestion are the predicted degrees of congestion regarding the monitored facilities.

The degree-of-congestion prediction unit 207 stores the degree of congestion predicted for each monitored facility (see FIG. 17).

The information generation unit 203 may generate congestion state information based on the predicted degrees of congestion. For example, the information generation unit 203 may generate the congestion state information using the predicted degrees of congestion instead of the degrees of congestion described in the first example embodiment. For example, the information generation unit 203 may generate congestion state information corresponding to FIGS. 3 to 6 using the predicted degrees of congestion. That is, the information generation unit 203 may provide the administrator with information regarding the future congestion state in each monitored facility.

Figure 18:
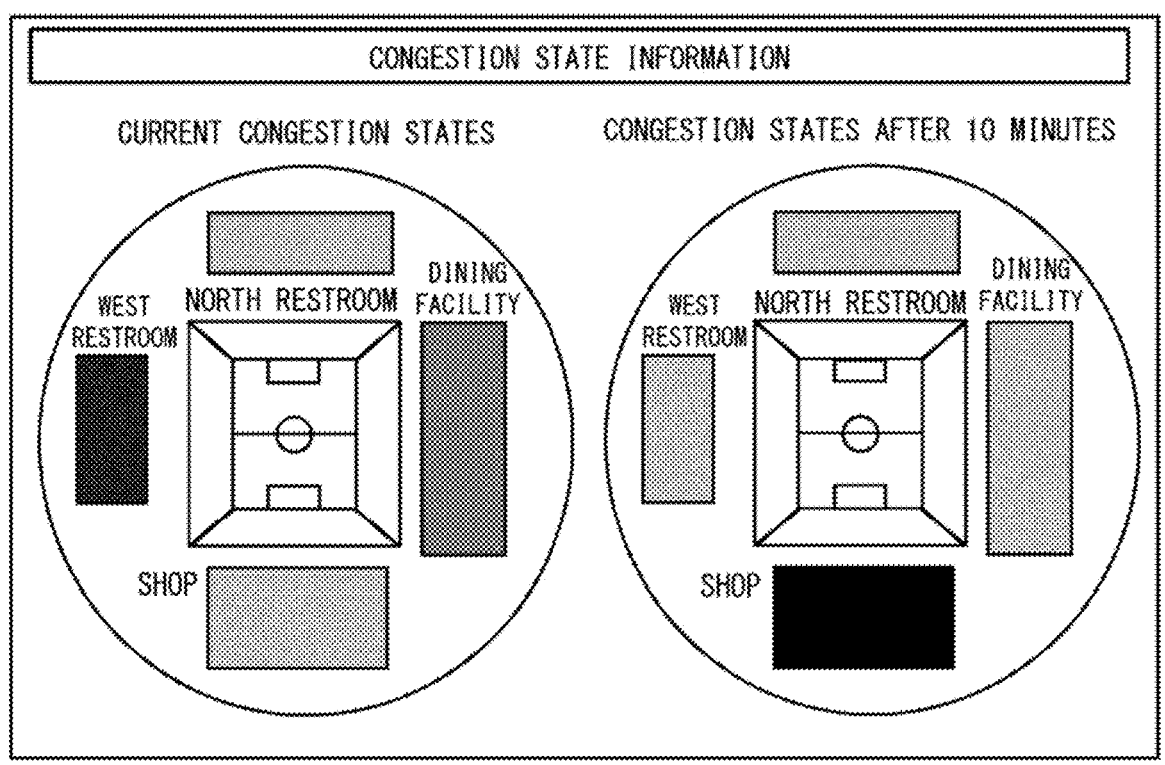
FIG. 18 is a diagram for explaining an operation of an information generation unit according to the third example embodiment.

Alternatively, the information generation unit 203 may generate congestion state information based on the current degrees of congestion (real-time degrees of congestion) and the future degrees of congestion (predicted degrees of congestion). For example, the information generation unit 203 may generate congestion state information including a heat map based on two degrees of congestion. In this case, the administrator terminal 40 performs display as illustrated in FIG. 18. The administrator who has viewed the congestion state information as illustrated in FIG. 18 can grasp that the congestion of the west restroom is resolved after 10 minutes, but the shop is congested in the same time zone. Note that FIG. 18 is an example, and the administrator terminal 40 may display future degrees of congestion at a time other than 10 minutes later.

Similarly to the information generation unit 203, the congestion resolution instruction unit 206 may generate the congestion resolution instruction based on the future degrees of congestion instead of the current degrees of congestion. In this case, since the congestion resolution instruction unit 206 instructs to resolve the congestion on the basis of the future degrees of congestion, it can be expected that a more accurate instruction is given. For example, when a congested monitored facility is present and the congestion is expected to be resolved after a predetermined period elapses, the congestion resolution instruction unit 206 maintains the current situation. On the other hand, when there is no expectation of the resolution of the congestion after a predetermined period has elapsed, the congestion resolution instruction unit 206 can take measures such as issuing an instruction to resolve the congestion of the congested facility. Alternatively, when the current state of the monitored facility cannot be said to be "congested", but it is predicted that the monitored facility will be congested after a predetermined period has elapsed, the congestion resolution instruction unit 206 can notify a staff member of the fact. As a result, the staff member can take preventive measures against future congestion.

As described above, the server device 10 according to the third example embodiment predicts the degree of congestion of each monitored facility. The server device 10 provides information to the administrator on the basis of the predicted degrees of congestion and instructs a staff member to resolve congestion. As a result, the provision of more useful information and a more accurate congestion resolution instruction can be expected.

Figure 19:
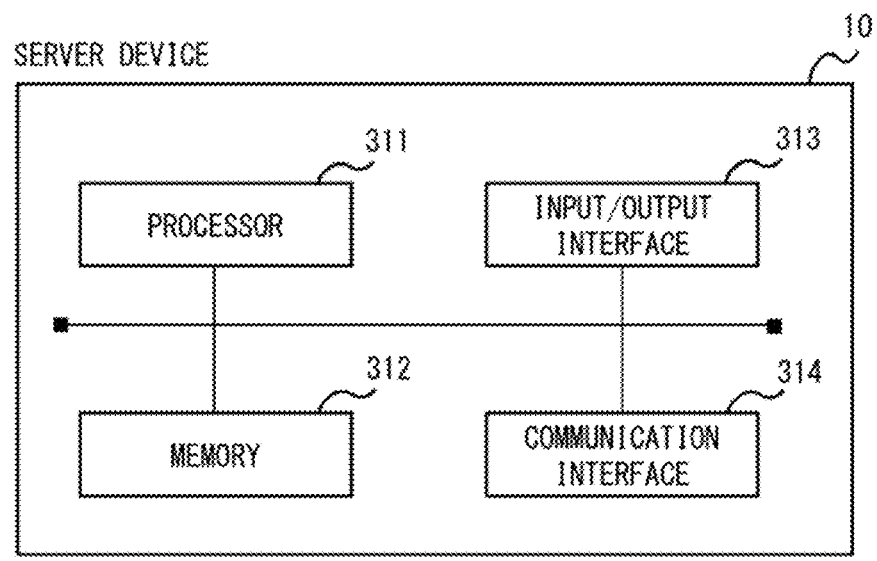
FIG. 19 is a diagram illustrating an example of a hardware configuration of a server device according to the disclosure of the present application.

Next, hardware of each device constituting the monitoring system will be described. FIG. 19 is a diagram illustrating an example of a hardware configuration of the server device 10.

The server device 10 can be constituted by an information processing device (so-called computer), and has the configuration illustrated in FIG. 19. For example, the server device 10 includes a processor 311, a memory 312, an input/output interface 313, a communication interface 314, and the like. The components such as the processor 311 are connected by an internal bus or the like, and are configured to be able to communicate with each other.

However, the configuration illustrated in FIG. 19 is not intended to limit the hardware configuration of the server device 10. The server device 10 may include hardware (not illustrated) or may not include the input/output interface 313 as necessary. In addition, the number of processors 311 and the like included in the server device 10 is not limited to the example illustrated in FIG. 19, and for example, a plurality of processors 311 may be included in the server device 10.

The processor 311 is a programmable device such as a central processing unit (CPU), a micro processing unit (MPU), or a digital signal processor (DSP). Alternatively, the processor 311 may be a device such as a field programmable gate array (FPGA) or an application specific integrated circuit (ASIC). The processor 311 is configured to execute various programs including an operating system (OS).

The memory 312 is a random access memory (RAM), a read only memory (ROM), a hard disk drive (HDD), a solid state drive (SSD), or the like. The memory 312 stores an OS program, an application program, and various data.

The input/output interface 313 is an interface of a display device (not illustrated) and an input device (not illustrated). The display device is, for example, a liquid crystal display or the like. The input device is, for example, a device that receives a user operation, such as a keyboard or a mouse.

The communication interface 314 is a circuit, a module, or the like that communicates with another device. For example, the communication interface 314 includes a network interface card (NIC) or the like.

The functions of the server device 10 are implemented by various processing modules. The processing modules are implemented, for example, by the processor 311 executing a program stored in the memory 312. Furthermore, the program can be recorded in a computer-readable storage medium. The storage medium may be a non-transient (non-transitory) medium such as a semiconductor memory, a hard disk, a magnetic recording medium, or an optical recording medium. That is, the present invention can also be embodied as a computer program product. Furthermore, the program can be downloaded via a network or updated using a storage medium storing the program. Further, the processing modules may be implemented by a semiconductor chip.

Note that the administrator terminal 40 and the like can also be constituted by an information processing device similarly to the server device 10, and since there is no difference in the basic hardware configuration from the server device 10, the description thereof will be omitted.

The server device 10 is equipped with a computer, and the functions of the server device 10 can be implemented by the computer executing the program. In addition, the server device 10 executes a method for controlling the server device by the program.

Modified Examples

Note that the configuration, operation, and the like of the monitoring system described in each of the above-described example embodiments are merely examples, and are not intended to limit the configuration and the like of the system.

In the above-described example embodiments, the case where the server device 10 stores the various types of table information and the like has been described. However, the table information may be constructed in a database server different from the server device 10. The monitoring system may include the various means (degree-of-congestion calculation unit 202, information generation unit 203, and the like) described in the above-described example embodiments.

In the above-described example embodiments, the case where the staff member is instructed to resolve congestion via the terminal 30 has been described. However, the instruction to resolve the congestion may be issued by another method. For example, the instruction to resolve the congestion may be given using a signage, a speaker, or the like installed in a waiting room where a staff member is waiting.

In the above-described example embodiments, it has been described that predetermined values are used as the "constants" used for calculating the degrees of congestion. However, the constants may be configured to be changeable by the administrator or the like. For example, the server device 10 may include an interface that enables the constants to be changed such that the constants in an epidemic period of an infectious disease are different from the constants in a non-epidemic period of the infectious disease.

In the above-described example embodiments, the case where the congestion state information and the like are provided to persons (administrator, staff members) in the event venue has been described. However, the congestion state information may be presented to visitors at the event venue. For example, the display as illustrated in FIGS. 3 to 5 may be performed on a signage, a liquid crystal monitor, or the like installed at each place in the event venue. Alternatively, the congestion state information may be transmitted to a smartphone or the like possessed by a visitor. Furthermore, in a case where the congestion state information is directly provided to a visitor, the signage or the like may make a proposal according to the situation of an event (for example, a game situation of baseball, soccer, or the like). For example, the signage or the like displays information such as "It is recommended to use a restroom for the next inning" or "It is recommended to use a restroom after the second half starts".

Furthermore, the congestion state information generated by the server device 10 may be notified to a staff member at the event venue. The staff member who has viewed the information may voluntarily take measures to resolve the congestion.

Alternatively, the server device 10 may acquire the above-described constants by analyzing the image data. Specifically, a footprint sticker (so-called sticker for securing a social distance) may be affixed to a floor near a monitored facility. The server device 10 (degree-of-congestion calculation unit 202) may count the number of footprint stickers appearing in the image data and use the number of footprint stickers for the calculation of the degree of congestion as a "constant (capacity)".

In the above-described example embodiments, the case of determining whether or not each monitored facility is congested by the threshold processing has been described. Here, the threshold used for the threshold processing may be changed according to a monitored facility (camera device 20), or may be changed according to a time zone or the like. That is, the criterion for determining "congested" may be changed according to a place or a time zone.

In the above-described example embodiments, the case of calculating the degrees of congestion using the image data obtained from the camera devices 20 has been described. However, the calculation of the degrees of congestion is not limited to the method using the image data. For example, the degrees of congestion may be calculated on the basis of detection signals from human sensors installed in the vicinity of the monitored facilities.

Alternatively, the camera devices 20 may calculate the degrees of congestion instead of the server device 10 calculating the degrees of congestion. The camera devices 20 may calculate the degrees of congestion of the monitored facilities to which the devices are assigned, and report the calculated degrees of congestion to the server device 10. In this case, it suffices for the camera devices 20 to have the function of the degree-of-congestion calculation unit 202 of the server device 10.

In the third example embodiment, the case of predicting the degrees of congestion using the learning models has been described. The learning models used for the prediction may be generated for each time zone. Specifically, in a case where the congestion state differs between an event held in the daytime and an event held in the nighttime, a learning model applied to the daytime time zone and a learning model applied to the nighttime time zone may be implemented in the server device 10.

Furthermore, regarding the generation of the learning models, the image data and the degrees of congestion after a lapse of a predetermined period of time from the acquisition of the image data are treated as teacher data, but a plurality of degrees of congestion obtained after a lapse of a changed period of time may be used as teacher data. For example, in the west restroom, the degree of congestion after 5 minutes, the degree of congestion after 10 minutes, and the degree of congestion after 30 minutes may be prepared as teacher data, and a learning model corresponding to each elapsed time may be generated. The server device 10 may generate congestion state information and the like by using learning models after different elapsed periods of time from among learning models regarding the same monitored facility. In the above-described example, the server device 10 may appropriately use the degree of congestion after 5 minutes, the degree of congestion after 10 minutes, and the degree of congestion after 30 minutes to generate congestion state information and a congestion resolution instruction. Alternatively, the server device 10 may generate congestion state information and the like by combining a plurality of degrees of congestion in different prediction time zones.

Furthermore, in a case where a correlation between monitored facilities on the congestion state of the event venue is recognized, a learning model may be generated using, as teacher data, image data regarding a plurality of monitored facilities and the degree of congestion after a predetermined period has elapsed in a specific monitored facility. For example, in a case where a relationship such as that the dining facility and the shop are not congested while a restroom is congested is recognized, image data of the restroom, the dining facility, and the shop at the same time and the degree of congestion after a predetermined period has elapsed in a facility (for example, the restroom) for which the degree of congestion is desired to be calculated are prepared as teacher data, and a learning model is generated. By calculating the degree of congestion using the learning model, the degree of congestion reflecting the correlation between the facilities can be obtained.

Figure 20:
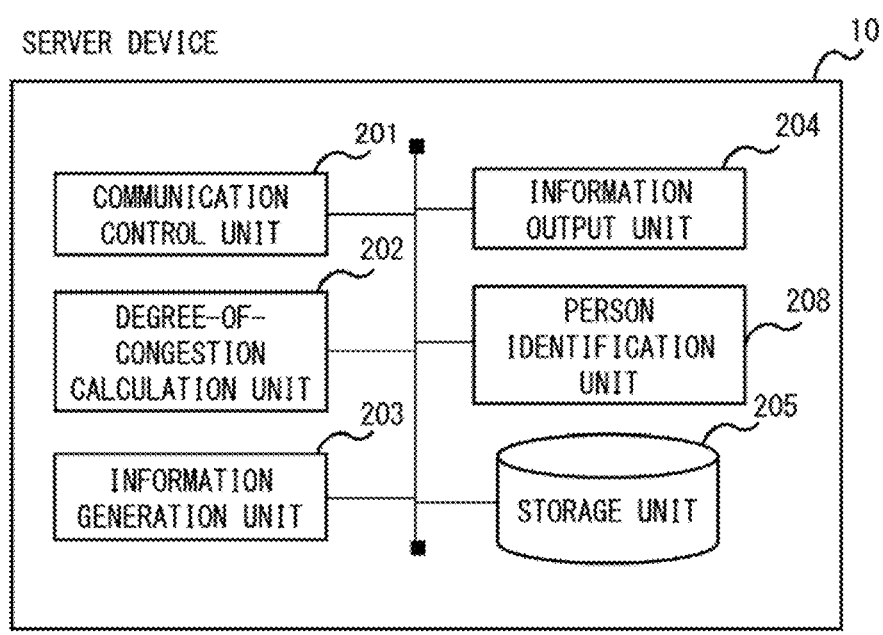
FIG. 20 is a diagram illustrating an example of a processing configuration of a server device according to a modified example of the disclosure of the present application.

The server device 10 may include a person identification unit 208 that identifies a predetermined specific person from the image data (see FIG. 20). The server device 10 stores biometric information of a person (so-called VIP (very important person)) who is important to an event company (event venue) or the like. For example, the server device 10 registers, in the database, a face image of the important person and a feature amount generated from the face image. The person identification unit 208 performs verification processing using a face image (biometric information) extracted from image data acquired from a camera device 20 and the biometric information registered in the database. When the verification processing is successful (when the important person registered in advance is waiting in line), the person identification unit 208 notifies the administrator terminal 40 or the terminal 30 possessed by the staff member of the fact. For example, the administrator instructs the staff member to go to the important person and prompt the important person to use a restroom for the staff. Alternatively, the staff member goes to the important person and takes appropriate measures.

In the flowchart (flowchart, sequence diagram) used in the above description, the plurality of steps (processes) is described in order, but the order in which the steps are executed in the example embodiment is not limited to the described order. In the example embodiment, for example, the order of the illustrated steps can be changed, for example, each process can be executed in parallel, within a range in which there is no problem in terms of content.

The above-described example embodiments have been described in detail in order to facilitate understanding of the disclosure of the present application, and it is not intended that all the configurations described above are necessary. In addition, in a case where a plurality of example embodiments has been described, each example embodiment may be used alone or in combination. For example, a part of the configuration of an example embodiment can be replaced with the configuration of another example embodiment, or the configuration of another example embodiment can be added to the configuration of the example embodiment. Furthermore, it is possible to add, remove, and replace other configurations for a part of the configuration of the example embodiment.

Although the industrial applicability of the present invention is apparent from the above description, the present invention can be suitably applied to a monitoring system operated in an event venue or the like.

Some or all of the above-described example embodiments can be described as the following supplementary notes, but are not limited to the following.

[Supplementary Note 1]

A server device including:
  a calculation unit configured to calculate a degree of congestion of a monitored facility that is a facility to be monitored for a congestion state; and
  an instruction unit configured to determine, based on the degree of congestion of the monitored facility, whether or not the monitored facility is congested, and instruct, when the monitored facility is congested, a staff member in a venue including the monitored facility to resolve the congestion of the congested monitored facility.

[Supplementary Note 2]

The server device according to supplementary note 1, further including:
  a generation unit configured to generate, based on the calculated degree of congestion of the monitored facility, congestion state information to be provided to an administrator who manages the venue; and
  an output unit configured to output the generated congestion state information.

[Supplementary Note 3]

The server device according to supplementary note 2, wherein the output unit outputs the generated congestion state information to an administrator terminal used by the administrator.

[Supplementary Note 4]

The server device according to supplementary note 2 or 3, wherein the calculation unit calculates the degree of congestion by analyzing image data obtained from a camera device installed so as to be able to photograph a line formed at the monitored facility.

[Supplementary Note 5]

The server device according to any one of supplementary notes 2 to 4, wherein the generation unit generates the congestion state information including a heat map in which a change in the degree of congestion of the monitored facility is expressed by a change in color.

[Supplementary Note 6]

The server device according to any one of supplementary notes 2 to 5, wherein the generation unit generates the congestion state information including map information that indicates the venue and on which the degree of congestion of the monitored facility is superimposed or map information that indicates the venue and on which a word obtained from the degree of congestion of the monitored facility is superimposed.

[Supplementary Note 7]

The server device according to any one of supplementary notes 2 to 6, wherein the instruction unit performs threshold processing on the degree of congestion of the monitored facility to determine whether or not the monitored facility is congested.

[Supplementary Note 8]

The server device according to supplementary note 7, wherein the instruction unit generates a congestion resolution instruction including information of the facility targeted for congestion resolution, and the output unit transmits the generated congestion resolution instruction to a terminal possessed by the staff member.

[Supplementary Note 9]

The server device according to supplementary note 8, wherein the instruction unit generates the congestion resolution instruction including not only the information of the facility targeted for the congestion resolution, but also information of a facility of the same type as the facility targeted for the congestion resolution.

[Supplementary Note 10]

The server device according to supplementary note 9, wherein the instruction unit generates the congestion resolution instruction including information of a facility that is of the same type as the facility targeted for the congestion resolution and in which a degree of congestion is equal to or less than a predetermined threshold.

[Supplementary Note 11]

The server device according to any one of supplementary notes 8 to 10, further including a prediction unit configured to predict a future degree of congestion regarding the monitored facility.

[Supplementary Note 12]

The server device according to supplementary note 11, wherein the generation unit generates the congestion state information based on the predicted degree of congestion.

[Supplementary Note 13]

The server device according to supplementary note 11 or 12, wherein the instruction unit generates the congestion resolution instruction based on the predicted degree of congestion.

[Supplementary Note 14]

A method for controlling a server device, the method including, by the server device:
  calculating a degree of congestion of a monitored facility that is a facility to be monitored for a congestion state;
  determining, based on the degree of congestion of the monitored facility, whether or not the monitored facility is congested; and instructing, when the monitored facility is congested, a staff member in a venue including the monitored facility to resolve the congestion of the congested monitored facility.

[Supplementary Note 15]

A computer-readable storage medium storing a program for causing a computer installed in a server device to execute:

processing of calculating a degree of congestion of a monitored facility that is a facility to be monitored for a congestion state;

processing of determining, based on the degree of congestion of the monitored facility, whether or not the monitored facility is congested; and processing of instructing, when the monitored facility is congested, a staff member in a venue including the monitored facility to resolve the congestion of the congested monitored facility.

The disclosures of the cited prior art literatures are incorporated herein by reference. Although the present invention has been described above with reference to the example embodiments, the present invention is not limited to the above-described example embodiments. It will be understood by those skilled in the art that these example embodiments are exemplary only and that various variations are possible without departing from the scope and spirit of the invention. That is, it goes without saying that the present invention includes various variations and modifications that can be made by those skilled in the art in accordance with the entire disclosure including the claims and the technical idea.

REFERENCE SIGNS LIST 10, 100 SERVER DEVICE
20-1 to 20-4 CAMERA DEVICE
30-1, 30-2 TERMINAL
40 ADMINISTRATOR TERMINAL
101 CALCULATION UNIT
102 INSTRUCTION UNIT
201 COMMUNICATION CONTROL UNIT
202 DEGREE-OF-CONGESTION CALCULATION UNIT
203 INFORMATION GENERATION UNIT
204 INFORMATION OUTPUT UNIT
205 STORAGE UNIT
206 CONGESTION RESOLUTION INSTRUCTION UNIT
207 DEGREE-OF-CONGESTION PREDICTION UNIT
208 PERSON IDENTIFICATION UNIT
311 PROCESSOR
312 MEMORY
313 INPUT/OUTPUT INTERFACE
314 COMMUNICATION INTERFACE

The invention claimed is:

1. A server device comprising:
a memory storing instructions; and
a processor configured to execute the instructions to:
calculate a degree of congestion of a monitored facility to be monitored for a congestion state;
determine, based on the degree of congestion of the monitored facility, whether or not the monitored facility is congested, by performing threshold processing on the degree of congestion of the monitored facility to determine that the monitored facility is congested if the degree of congestion is higher than a first threshold value;
generate a congestion resolution instruction including:
information of the facility targeted for congestion resolution, and
information of a facility of a same type as the facility targeted for the congestion resolution and in which a degree of congestion is equal to or less than a second threshold value,
wherein information regarding a facility in which a degree of congestion is higher than a third threshold value less than the first threshold value and higher than the second threshold value is not included in the congestion resolution instruction; and
instruct, when the monitored facility is congested, a staff member in a venue including the monitored facility to resolve the congestion of the congested monitored facility, by transmitting the generated congestion resolution instruction to a terminal possessed by the staff member.

2. The server device according to claim 1, wherein the processor is further configured to execute the instructions to:
generate, based on the calculated degree of congestion of the monitored facility, congestion state information to be provided to an administrator who manages the venue; and
output the generated congestion state information.

3. The server device according to claim 2, wherein the processor is further configured to execute the instructions to:
output the generated congestion state information to an administrator terminal used by the administrator.

4. The server device according to claim 2, wherein the processor is further configured to execute the instructions to:
calculate the degree of congestion by analyzing image data obtained from a camera device installed so as to be able to photograph a line formed at the monitored facility.

5. The server device according to claim 2, wherein the processor is further configured to execute the instructions to:
generate the congestion state information including a heat map in which a change in the degree of congestion of the monitored facility is expressed by a change in color.

6. The server device according to claim 2, wherein the processor is further configured to execute the instructions to:
generate the congestion state information including map information that indicates the venue and on which the degree of congestion of the monitored facility is superimposed or map information that indicates the venue and on which a word obtained from the degree of congestion of the monitored facility is superimposed.

7. The server device according to claim 2, wherein the processor is further configured to execute the instructions to:
predict a future degree of congestion regarding the monitored facility.

8. The server device according to claim 7, wherein the processor is further configured to execute the instructions to:
generate the congestion state information based on the predicted degree of congestion.

9. He server device according to claim 7, wherein the processor is further configured to execute the instructions to:
generate the congestion resolution instruction based on the predicted degree of congestion.

10. A method performed by a server device and comprising:
calculating a degree of congestion of a monitored facility to be monitored for a congestion state;
determining, based on the degree of congestion of the monitored facility, whether or not the monitored facility is congested, by performing threshold processing on the degree of congestion of the monitored facility to determine that the monitored facility is congested if the degree of congestion is higher than a first threshold value;

generating a congestion resolution instruction including:
information of the facility targeted for congestion resolution, and
information of a facility of a same type as the facility targeted for the congestion resolution and in which a degree of congestion is equal to or less than a second threshold value,
wherein information regarding a facility in which a degree of congestion is higher than a third threshold value less than the first threshold value and higher than the second threshold value is not included in the congestion resolution instruction; and instructing, when the monitored facility is congested, a staff member in a venue including the monitored facility to resolve the congestion of the congested monitored facility, by transmitting the generated congestion resolution instruction to a terminal possessed by the staff member.

11. A non-transitory computer-readable storage medium storing a program executable by a computer to perform processing comprising:
calculating a degree of congestion of a monitored facility to be monitored for a congestion state;
determining, based on the degree of congestion of the monitored facility, whether or not the monitored facility is congested, by performing threshold processing on the degree of congestion of the monitored facility to determine that the monitored facility is congested if the degree of congestion is higher than a first threshold value;

generating a congestion resolution instruction including:
information of the facility targeted for congestion resolution, and
information of a facility of a same type as the facility targeted for the congestion resolution and in which a degree of congestion is equal to or less than a second threshold value,
wherein information regarding a facility in which a degree of congestion is higher than a third threshold value less than the first threshold value and higher than the second threshold value is not included in the congestion resolution instruction; and instructing, when the monitored facility is congested, a staff member in a venue including the monitored facility to resolve the congestion of the congested monitored facility, by transmitting the generated congestion resolution instruction to a terminal possessed by the staff member.

* * * * *